United States Patent [19]

Haslach, Jr.

[11] Patent Number: 4,596,209
[45] Date of Patent: Jun. 24, 1986

[54] WIND TURBINE HEAT GENERATING APPARATUS

[76] Inventor: Henry W. Haslach, Jr., 8 Frances Ct., Madison, Wis. 53703

[21] Appl. No.: 701,115

[22] Filed: Feb. 13, 1985

[51] Int. Cl.[4] .............................................. F28C 3/00
[52] U.S. Cl. ..................................... 122/26; 126/247; 237/1 R
[58] Field of Search .......................... 126/247; 122/26; 237/1 R

[56] References Cited

U.S. PATENT DOCUMENTS 4,366,779 1/1983 Knecht .................................. 122/26

OTHER PUBLICATIONS

"Windpowered Heat Generation Unit", by H. Fujii, Y. Kita and Y. Nomura, pp. 1–10, presented at the Second ASME Wind Energy Symposium in Houston, Texas, Jan. 30th–Feb. 3, 1983.
"A Study of Direct Heat Exchange System for Straight Blade Non-Articulated Vertical Axis Wind Turbine", by K. Seki, Y. Shimizu and S. Narita, pp. 93–97, presented at the Third ASME Wind Energy Symposium in New Orleans, LA, on Feb. 14, 1984.
"The Optimum Viscosity of the Working Fluid for Positive Displacement Machines", by P. M. Howely, K. S. Kelso and D. E. Turnbull, pp. 1–10, an ASME publication.

Primary Examiner—Henry Bennett
Attorney, Agent, or Firm—Quarles & Brady

[57] ABSTRACT

An apparatus for converting wind energy into heat in a manner that a wind turbine operates at its optimal tip speed ratio in varying windspeeds. An accelerometer is employed in conjunction with the wind turbine to vary the size of a discharge orifice in relation to the acceleration of the wind turbine. The wind turbine drives a positive displacement pump which is submerged in a fluid to force the fluid through the discharge orifice so that the energy of the pressurized fluid is converted into useful heat.

12 Claims, 5 Drawing Figures

WIND TURBINE HEAT GENERATING APPARATUS

BACKGROUND OF THE INVENTION

This invention relates to a heat generating apparatus which includes a wind turbine and a fluid pump device for forcing liquid through a discharge orifice and into a fluid reservoir. More particularly, this invention is concerned with an improved heat generating apparatus of the foregoing type wherein an accelerometer is employed in conjunction with the wind turbine and the discharge orifice to vary the size of the discharge orifice in relation to the speed and acceleration of rotation of the wind turbine so that the turbine operates at its optimum tip speed ratio in varying wind speeds.

Heat sources are needed which are decentralized in that they do not depend on the commercial utility grid for remote areas and for times when the grid is not reliable or when power from the grid becomes too expensive. Wind energy provides such a source. Wind energy is renewable and inexpensive; it does not increase pollution and does not contribute to the greenhouse effect. The wind system would be more efficient if heat is directly generated rather than converted from electricity generated from the wind. Typical uses might include residential space heating, hot water heating for direct use, industrial process heating, grain drying on farms or distillation of fresh water from seawater near oceans.

It has long been known, for example by those who work with hydraulic devices that hydraulic fluids become warmer after usage. A fluid forced through an orifice or slot will become heated. This phenomenon was used in John E. Knecht's "Wind Driven Heating System" as described in U.S. Pat. No. 4,366,779. The present invention is an improvement of Knecht's system to more efficiently extract power from the wind. The apparatus employed by Knecht was designed for a steady wind under the apparent assumption that it would work well in a range of variable winds and has a gear pump at the top of the tower. In contrast, the apparatus of this invention has the reservoir at ground level where it is unaffected by turbine rotation and reduces weight on the tower. Further the apparatus of this invention employs an accelerometer to measure the effect on the turbine of a variable wind and to adjust the discharge orifice thereby maximizing energy extraction from the wind.

A fixed orifice system of the general foregoing type was built at the Shimadzu Corporation of Kyoto, Japan. Their orifice does not respond to wind acceleration but does have a flow rate limiter to prevent the turbine from over-speeding. The orifice also has a wax actuated stop valve to close the orifice when the temperature becomes too high and so prevents overheating of the system. Their results were presented in "Windpowered Heat Generation Unit" by H. Fuji, Y. Kita and Y. Nomura at the Second ASME Wind Energy Symposium, Houston, Tex., Jan. 30th–Feb. 3, 1983.

In a paper presented at the Third ASME Wind Energy Symposium in New Orleans, La. on Feb. 14, 1984, K. Seki, Y. Shimizu and S. Narita of Tokai University, Kanagawa, Japan and entitled "A Study of Direct Heat Exchange System for Straight Blade Non-Articulated Vertical Axis Wind Turbine" a system of the type concerned with in this invention was described which also has a fixied orifice. A computer was employed to electronically control the load on a straight blade vertical axis turbine in response to changes sensed in wind speed. The electronics in the described system make it expensive and no measurement of the ratio of the angular acceleration to angular velocity squared of the shaft was presented.

It is an advantage of this invention to provide an apparatus for producing heat from a renewable energy source wherein a self-governing device extracts the optimal power possible from the wind for a given turbine and converts most of the energy extracted from the wind into heat by assuring that the friction in the system is converted to useful heat.

Another advantage of this invention is to provide heat from the wind by purely mechanical means so that the system is useful in remote areas and results in a cost savings by being independent from the utility system as well as to provide a simple mechanical system which may be easily repaired by a user with few technical skills.

A still further advantage is the control of a wind turbine so that it operates at its optimal tip speed ratio by matching the heat converter to any given wind turbine by the proper accelerometer to orifice linkage, pressurizer gear size, and adjustable orifice size.

Yet another advantage of the invention is an apparatus of the following type which can be used for many heating applications including residential, farming or industrial. For example: on farms it can be used for grain drying; in warm arid regions it can be used in a water distillation system to provide pure water; and in cold regions it can replace or supplement space heating or hot water heating now done by combustion or electrical means.

SUMMARY OF THE INVENTION

The foregoing advantages are accomplished and the shortcomings of the prior art are overcome by the present apparatus for converting wind energy into heat in a manner that a wind turbine operates at its optimal tip speed ratio in varying windspeeds. The present apparatus includes a wind turbine and a fluid reservoir adapted to receive fluid material. A positive displacement pump is operatively positioned in the fluid reservoir and driven by the turbine. Inlet and outlet means for the fluid are operatively associated with the pump. A discharge orifice is in fluid communication with the outlet means. Means are operatively connected to the wind turbine to vary the size of the discharge orifice in relation to the speed of rotation and acceleration of the wind turbine. The means to so vary the size of the discharge orifice includes an accelerometer apparatus operatively connected to the shaft of the wind turbine. Preferably, the accelerometer includes a multiplicity of arm members secured to the shaft of the wind turbine with one-half of the arm members having pivotal extension sections. Cable members are attached at one end to each of the pivotal sections. At least two of the discharge orifices are in fluid communication with the outlet means and at least two cap members are slidably received over the discharge orifices. Interconnecting means are provided to connect the cable members at their other ends to the cap members. Also in a preferred manner, the accelerometer includes pulley members attached to one-half of the arm members and engaged by the cable members and the interconnecting means includes a slider member slidably received on the shaft of the wind turbine and below the arm members with the slider member being interconnected to the cap members. The cap members can be connected to the slider member by rotatable ball members and the cable members are attached to the slider member. The positive displacement pump has a central drive gear mounted for rotation on the shaft of the turbine and two pinion gears are mounted to meshingly engage the drive gear. A heat exchanger is operatively connected to the fluid reservoir for heat transfer purposes.

BRIEF DESCRIPTION OF DRAWINGS

A better understanding of the present wind turbine heat generating apparatus will be accomplished by reference to the drawings wherein.

DESCRIPTION OF THE PREFERRED EMBODIMENT

Figure 1:
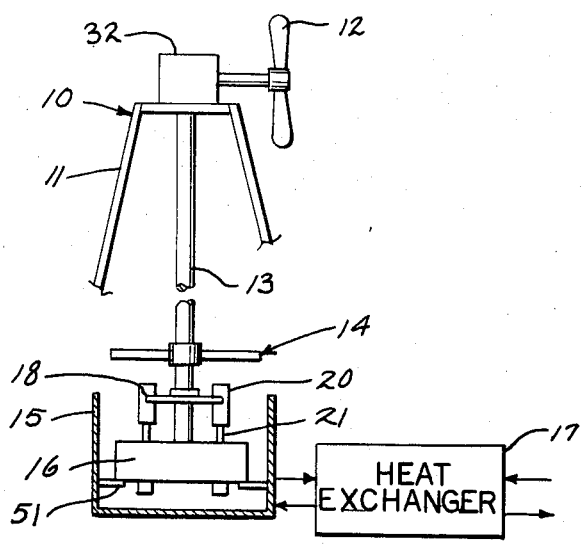
FIG. 1 is a diagrammatic view of the wind turbine apparatus of this invention as it would normally be operated in conjunction with a heat exchanger.

Proceeding to a detailed description of the present invention, the windmill turbine apparatus generally 10 includes the usual tower 11 for supporting a wind turbine 12 of the windmill type. A shaft 13 extends from a gear train 32 for connection with an accelerometer generally 14. The accelerometer 14 is connected by means of a slider 18 connected to caps 20 positioned over tubular discharge conduit 21 extending from a gear pump 16. The gear pump 16 is positioned in the reservoir 15 by means of the supports 51. A heat exchanger 17 is in fluid communication with the reservoir 15 and will include the usual heat exchange conduits 23, as seen in FIG. 2.

Figure 2:
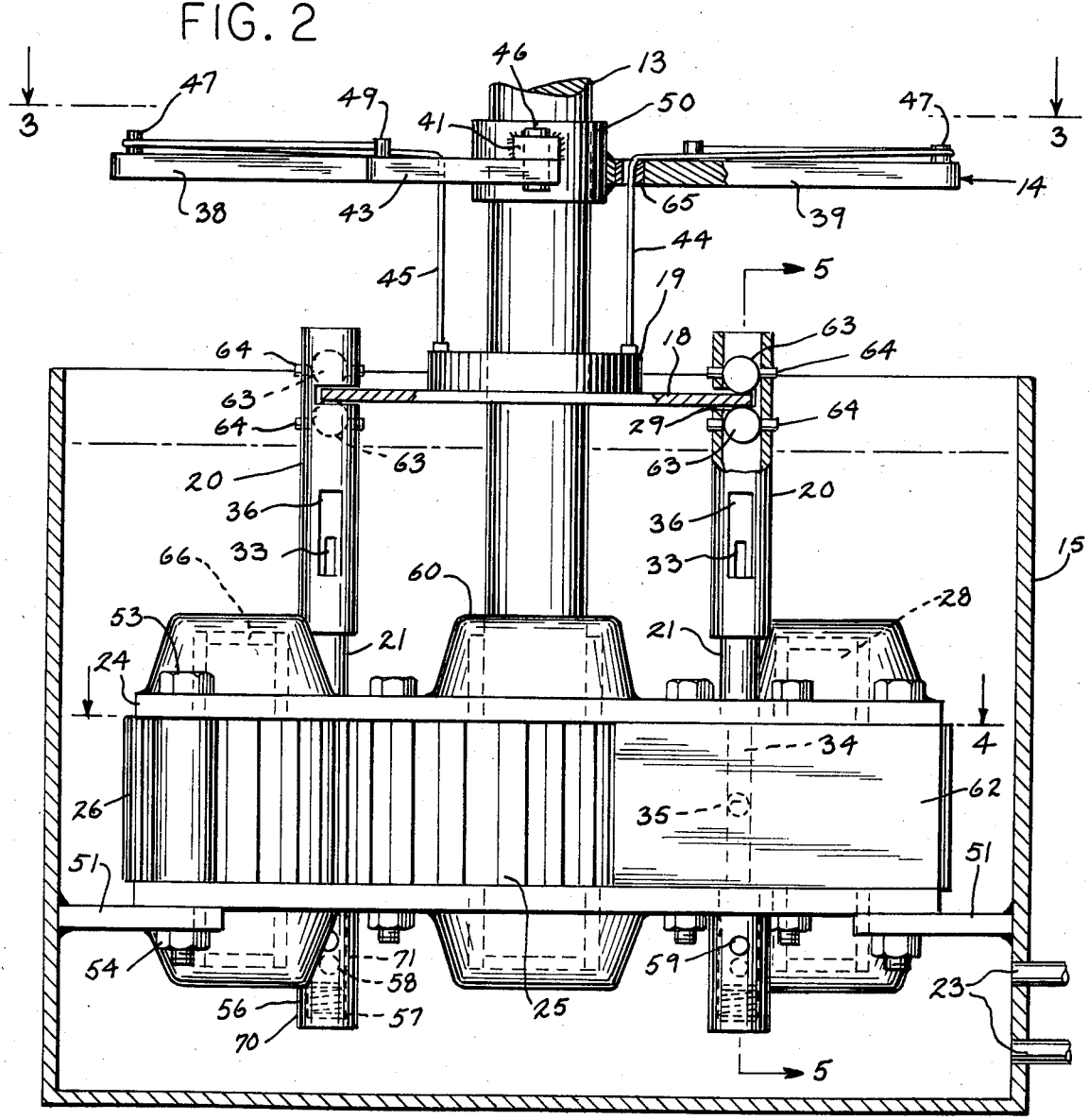
FIG. 2 is an enlarged view of the wind turbine apparatus shown in FIG. 1 except not showing the turbine or the supporting tower for it.
Figure 5:
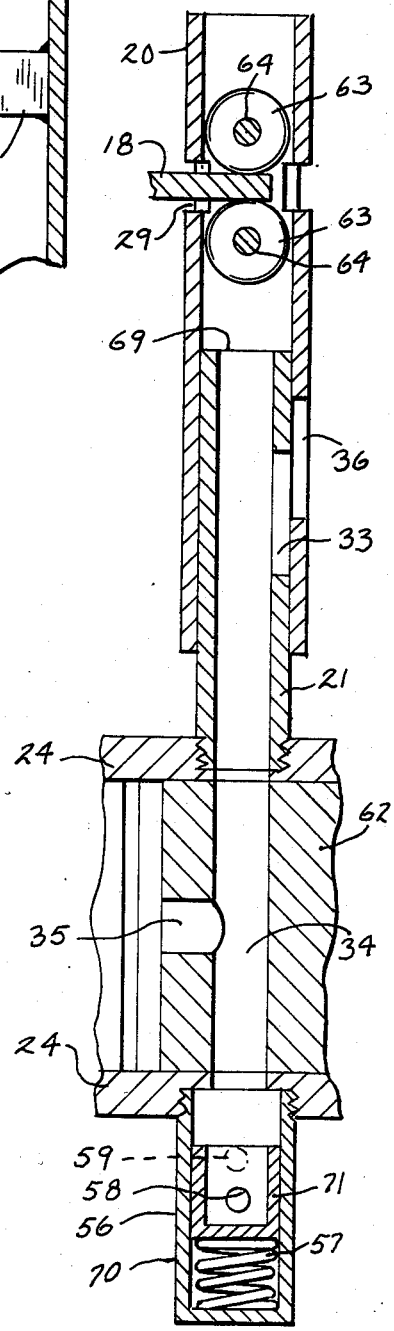
FIG. 5 is an enlarged view in vertical section taken along line 5—5 of FIG. 2.

Referring specifically to FIG. 2, the gear pump 16 will include the housing 62 and plates 24. Two tubular discharge conduits 21 extend from upper plate 24 over which are placed cap numbers 20. Elongated discharge orifices 33 are provided in the tubular discharge conduits 21 and elongated discharge slots 36 are disposed in the caps 20 for orientation therewith. Positioned at the opposite ends of the tubular discharge conduits 21 are reverse type relief valves 56 which include an outer cap 70 secured to housing 24 with an orifice 59. Positioned inside outer cap 70 in a slidable manner is an inner cap 71 with an orifice 58 for alignment with orifice 59 which is shown in FIG. 5 in phantom for illustration purposes. The usual expansion spring 57 will bias the inner cap 71 so that the orifices 58 and 59 are aligned and in the open position when the fluid pump 16 is operating under minimum pressure conditions. As best seen in FIG. 5, the relief valves 56 are in fluid communication with the tubular discharge conduits 21 by means of the discharge channels 34 extending through the housing 62.

Figure 4:
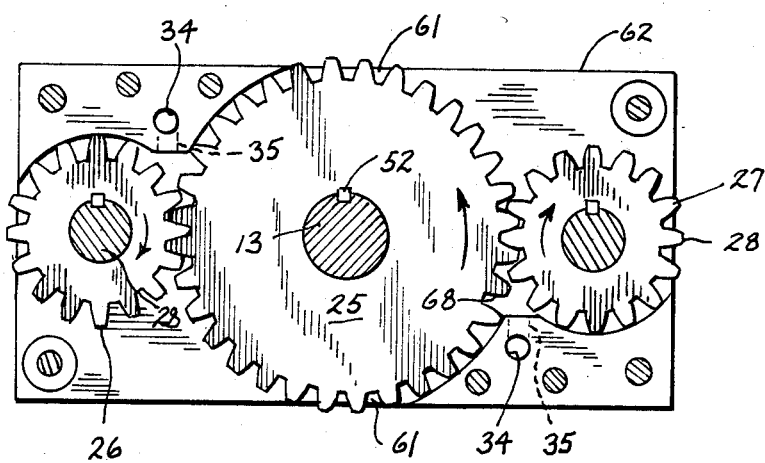
FIG. 4 is a view in horizontal section taken along line 4—4 of FIG. 2.

Referring to both FIGS. 2 and 4, it will be seen that the gear pump housing 62 rotatably accommodates a central drive gear 25 for meshing engagement with pinion gears 26 and 27. The gears 25, 26 and 27 are received in complementary compartments in the housing 62 as is standard for a gear pump to provide the usual high and low pressure areas 68 and 61, respectively. Gears 26 and 27 are rotatably mounted in the housing 62 by the usual shafts 28 and are held thereon by the standard key ways 52. The ends of shafts 28 and 30 are housed in hub housings such as 60 which will also house the usual bearing members such as 66 and a bushing 67 for the shaft 13. Bolts 53, nuts 54 and spacers 55 afford the usual interconnection of the housing plates 24 as well as the hub housings 60 for enclosing the bearings 66 and the bushing 67. A slider plate 18 of the accelerometer 14 is received in the upper portion of cap members 20 by a suitable slot 29 with the end portions of the slider 18 engaged by the balls 63 rotatably secured in the cap members 20 by the shafts 64. The slider plate 18 is slidably received over the shaft 13 as is the attached collar 19. Cable members 44 and 45 are attached to the collar 19 and extend upwardly through the arms 38 and 39 as indicated by an opening through the bushing 65.

Figure 3:
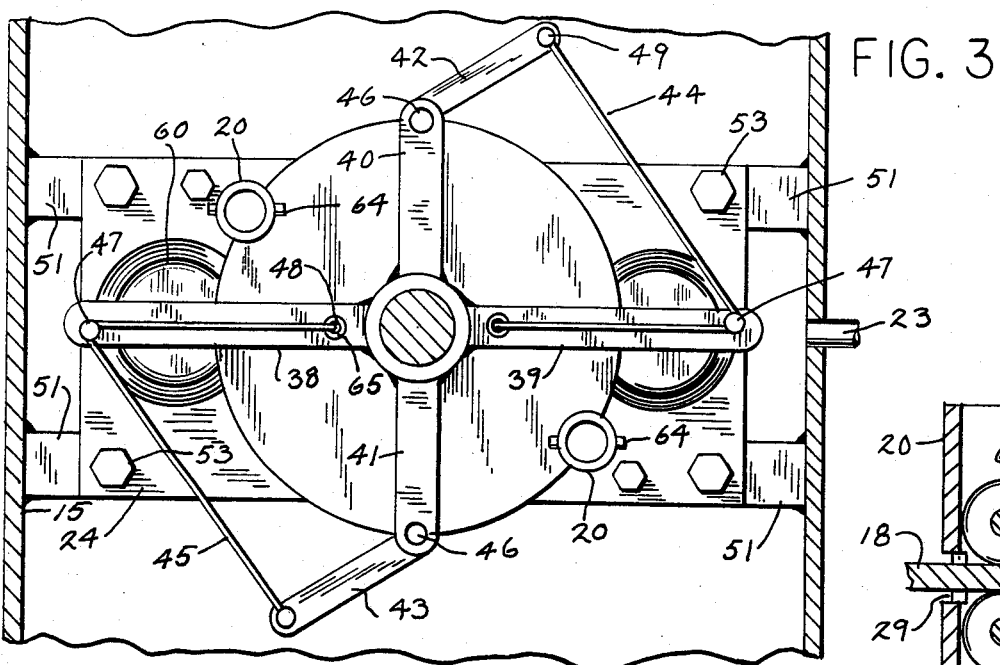
FIG. 3 is a view in horizontal section taken along line 3—3 of FIG. 2 and showing an accelerating shaft.

As best seen in FIG. 3, the accelerometer 14 includes four oppositely extending arms 38, 39, 40 and 41 which are secured to the shaft 13 through the hub 50. The arms 40 and 41 have sections 42 and 43 pivotally attached to the ends thereof by the pivot pins 46. The cable members 44 and 45 are secured thereto by the connectors 49 and are guided by the pulley members 47 on the arms 38 and 39 over which the cables 44 and 45 extend in a longitudinal manner. Openings in the bushings 65 disposed in the arms 38 and 39 provide passage for the cable members 44 and 45 for ultimate connection with the collar 19.

OPERATIONS

A better understanding of the advantages of the wind turbine apparatus 10 will be held by a description of its operation. It will be appreciated that as a viscous fluid such as an oil 22 in the reservoir 15 is forced through an orifice 33 as well as 36 that the fluid will be heated. Accordingly, as the wind turbine 12 is operated in the usual manner, this will cause a turning of the shaft 13 which will cause the drive gear 25 to move in a counterclockwise motion as indicated in FIG. 4. This motion will cause the pinion gears 26 and 27 to rotate in the manner indicated by the direction of the arrows. As the gears rotate, they will move the fluid 22 from an area of low compression 61 to one of high compression 68. The high pressure liquid will then be forced outwardly through the transverse passage 35 in the housing 62 and into the upwardly and downwardly extending channel 34. From there the fluid will move in the direction of the relief valves 56 to effect an incremental closing as well as upwardly against the end wall 69 of the tubular discharge conduit 21. The fluid 22 will also pass through the orifices 33 as well as the orifices 36 in the cap members 20.

In order to control the turbine tip speed ratio in varying wind speeds for maximum efficiency, it has been found that the size of the orifices 33 should be proportionately regulated. This regulation is achieved by the accelerometer 14. As the turbine 12 moves at an accelerated rate in the wind, this will cause an acceleration also of the shaft 13 in a counterclockwise motion which in turn will effect the acceleration of the arms 40 and 41 as well as the arms 38 and 39. This acceleration will cause the pivotal sections 42 and 43 to move clockwise with respect to the shaft 13. This inward movement will cause the distance of the cable members 44 and 45 between the pivotal sections 42 and 43 and the respective arms 38 and 39 to become less. This in turn will cause the collar 19 and the slider 18 to descend as viewed in FIG. 2. This descending of the slider 18 will also cause the cap members 20 to move downwardly over the tubular discharge conduits 21. This downward movement will cause a greater portion of the discharge slot 36 of the cap 20 to orientate with the discharge orifice 33 of the tubular discharge conduit 21. This is best seen in conjunction with FIG. 5. Accordingly, as the gear pump 16 is being accelerated with the fluid being pumped therefrom and into the tubular discharge conduit 21, more fluid will be permitted to pass outwardly from the passage 33. This of course will be an incremental orientation. Conversely, as the wind turbine decelerates, the pivotal arms sections 42 and 43 will move counterclockwise from the shaft 13 thus increasing the distance that the cable members 44 and 45 will extend from the arms 38 and 39 and accordingly will lift the slider 18 upwardly. This upward motion of course will then move the passageways 36 upwardly over the passages 33 and effect an incremental decreasing of the flow of fluid through the orifices 33.

An important feature of this invention is the fact that the accelerometer 14 will effect the foregoing increase or decrease of flow through the orifices 33 in direct proportion to the acceleration or deceleration of the wind turbine 12 blade tip speed.

The foregoing design of the accelerometer 14 is based on the fact that the orifice size required to maintain operation at a constant tip speed ratio depends on the ratio $a/\omega^2$ where $a$ is the angular acceleration of the wind turbine shaft in radians per second squared and $\omega$ is the shaft speed in radians per second. The accelerometer measures this ratio mechanically so that the system can be completely self-contained. The design depends on the observation that the acceleration of a particle rotating about a fixed point is $a = r\omega^2 n + r\alpha t$, where $n$ and $t$ are the normal and tangential unit vectors respectively. Therefore the tangent of the angle, $\theta$, that the acceleration vector makes with the normal is $\tan \theta = a/\omega^2$. This suggests that a thin bar such as 42 pinned to the end of the thin bar 40 welded to the drive shaft of the turbine so that both bars are in the horizontal plane should point with an angle $\theta$ to the bar 40 as indicated in FIG. 3. The dynamical equations for such a structure verify this conclusion. Both arms 40 and 42 are indicated as being of equal length, although this is not necessary. It should also be recognized that while the accelerometer 14 is the preferred one, with the slider 18 interconnected to the caps 20 by the balls 63, other linkage systems can be used to connect the outer caps 20 to the slider 18, such as cams and followers, gears or mechanical linkages.

The double orifice system as provided by the high pressure areas 68, the discharge channels 34, 35 and the discharge orifices 33 and 36 helps balance the load on the shaft 13 of the drive gear 25. This permits the two linkage systems such as provided by the slider 18 interconnected with the cap members 20, thereby balancing the load on the accelerometer.

The pressurizer as provided by the pump 16 should be structurally sound and should satisfy two additional criteria: one because it is loaded by the turbine and one because it forces fluid through the orifice. First, the internal pressure at maximum wind speed before turbine shut down must be low enough to be supported by the material and not cause balancing problems on the bearings. Second, the orifice must be large enough to be easily manufactured and so that small errors in alignment due to construction or slippage of the link to the accelerometer will not be significant. Both conditions are satisfied by making the pressurizer displacement sufficiently large.

The preferred fluid 22 is a viscous oil. The viscosity of the fluid can be chosen to maximize the average efficiency of the pump 16 pressurized over its operating rotational speed and pressure ranges according to methods such as proposed by P. M. Howely, K. S. Kelso and D. E. Turnbull, "The Optimum Viscosity of the Working Fluid for Positive Displacement Machines, ASME Publication 81-WA/DSC-4."

It should be pointed out that the ratio of the slider 18 motion to the required motion of the orifice caps 20 to hold the turbine at a constant tip speed ratio so that it extracts optimal power from the wind depends on the following factors: the length of the arms 38, 39, 40, 41, 42, 43, in the accelerometer 14; the displacement of the pump pressurizer 16 (the amount of fluid it moves); the area of the approach channels 34 and 35, the density of the fluid 22; the mass moment of inertia of the turbine; the gear ratio in the gear train 32, and the width of the orifices 33 and 36.

In the preferred embodiment, the gears 25, 26 and 27, the approach channel area 34 and 35 and the lengths of the accelerometer links such as between the slider 18 and the cap members 20 are sized for a particular turbine so that this ratio is one to one. In this embodiment, the slider 18 is of large enough diameter that its edge is directly above the orifice valve cap members 20 so that a transverse fitment can be made between the caps 20 and the slider 18. If the ratio is not one to one for a particular turbine, then different linkages, such as cams and followers or gears, may be used and slider 18 sized accordingly.

Another advantage of the wind turbine apparatus 10 of this invention resides in the fact that the primary function of the pressurizer is simply to agitate the fluid. Stated differently, it is not required to deliver a fixed rate of fluid flow at a given pressure differential. Nor, since the pressurizer is immersed in the working fluid reservoir so that frictional losses are converted to heat in the fluid, is friction of major concern. The only requirement is to match the orifice outlet area to the turbine. But to assure the proper match, the design should measure the slip flow which modifies the amount of fluid delivered to the orifice and should measure the actual rather than the ideal torque.

Also in the preferred embodiment, a gear pump 16 with two discharge orifices was described. If desired, a gear pump with a multiplicity of pinion gears could be employed with a multiplicity of discharge orifices and conduits with cap members 20 operatively positioned with respect thereto and interconnected to a slide plate 18. Alternatively, a single discharge orifice and conduit could be advantageously used in the foregoing described manner with the accelerometer.

It will thus be seen that through the present invention there is now provided a wind driven heat generating apparatus which operates with maximum efficiency. The apparatus of this invention can be manufactured with standard components and readily available materials. Accordingly, a cost effective apparatus is afforded to generate heat from a readily available source of energy.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An apparatus for converting wind energy into heat in a manner that a wind turbine operates at its optimal tip speed ratio in varying windspeeds comprising:
    a wind turbine;
    a fluid reservoir adapted to receive a fluid material;
    a positive displacement pump operatively positioned in said fluid reservoir and driven by said turbine;
    inlet and outlet means for said fluid operatively associated with said pump;
    a discharge orifice in fluid communication with said outlet means; and
    means operatively connected to said wind turbine to vary the size of said discharge orifice in relation to the velocity and acceleration of said wind turbine.

2. The apparatus of claim 1 wherein said means to vary the size of said discharge orifice includes an accelerometer apparatus operatively connected to a shaft of said wind turbine.

3. The apparatus of claim 2 wherein said accelerometer includes:
    a multiplicity of arm members secured to said shaft of said wind turbine with one-half of said arm members defined by pivotal extension sections;
    cable members attached at one end to each said pivotal sections;
    at least one said discharge orifice in fluid communication with said outlet means; and
    at least one cap member slidably received over said discharge orifices; and
    means interconnecting said cable members at their other ends to said cap members.

4. The apparatus of claim 3 wherein said accelerometer is further defined by pulley members operatively attached to one-half of said arm members and engaged by said cable members and said interconnecting means includes a slider member slidably received on said shaft of said wind turbine and below said arm members, said slider member being interconnected to said cap members.

5. The apparatus of claim 4 wherein said cap members are connected to said slider member by means of rotatable ball members.

6. The apparatus of claim 3 wherein said positive displacement pump is defined by a central drive gear mounted for rotation on said shaft of said turbine and at least one pinion gear rotatably mounted to meshingly engage said central drive gear.

7. The apparatus of claim 1 further including a heat exchanger operatively associated with said fluid reservoir.

8. In a compact and highly efficient apparatus for converting wind energy into heat wherein a wind turbine operates at its optimal tip speed ratio in varying windspeeds, said wind turbine adapted to be operatively connected to a positive displacement pump operatively positioned in a reservoir containing a fluid said pump having inlet and outlet means with the outlet means in fluid communication with a discharge orifice, said wind turbine having a rotatable drive shaft with said drive shaft adapted to be connected to said positive displacement pump, the improvement comprising:
    accelerometer means operatively connected to said drive shaft and to said discharge orifice to vary the size of said orifice in relation to the rotational speed and acceleration of said wind turbine.

9. The improvement of claim 8 wherein said accelerometer means includes slidable members operatively positioned with respect to said pump outlet means.

10. The improvement of claim 9 wherein said slidable members are defined by cap members having discharge slots.

11. The improvement of claim 10 wherein said accelerometer means further includes a multiplicity of arm members operatively connected to said shaft of said wind turbine with one-half of said arm members defined by pivotal extension sections;
    cable members attached at one end to each said pivotal section;
    said discharge orifice is represented by at least two discharge orifices with said cap members slidably received over each discharge orifice; and
    means interconnecting said cable members at their other ends to said cap members.

12. The improvement of claim 11 wherein said accelerometer means is further defined by pulley members operatively attached to one-half of said arm members and said interconnecting means includes a slider member slidably received on said wind turbine shaft and below said arm members, said slider member being interconnected to said cap members.

* * * * *